US012739613B2

(12) United States Patent
Billing et al.

(10) Patent No.: US 12,739,613 B2
(45) Date of Patent: Sep. 15, 2026

(54) DEVICE, SYSTEM, AND METHOD FOR UPDATING SUBSCRIBER RECORDS AT A CALL CONTROLLER TO MAINTAIN ONGOING CALLS

(71) Applicant: MOTOROLA SOLUTIONS, INC., Chicago, IL (US)

(72) Inventors: Knud J Billing, Helsingoer (DK); Henrik Christian Lund, Roskilde (DK); Paw Saabye Pedersen, Taastrup (DK); Nikolaos R. Zampelis, Kongens Lyngby (DK)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 307 days.

(21) Appl. No.: 18/736,853

(22) Filed: Jun. 7, 2024

(65) Prior Publication Data

US 2025/0380126 A1 Dec. 11, 2025

(51) Int. Cl.
*H04W 8/18* (2009.01)

(52) U.S. Cl.
CPC .................................... *H04W 8/18* (2013.01)

(58) Field of Classification Search
None
See application file for complete search history.

(56) References Cited

U.S. PATENT DOCUMENTS 5,913,160 A 6/1999 Leung
6,067,454 A 5/2000 Foti
6,224,477 B1 * 5/2001 Ho .......................... H04W 8/18 455/433
6,615,038 B1 9/2003 Moles et al.
2008/0198999 A1 * 8/2008 Bantukul ............... H04Q 3/005 379/221.13
2022/0350792 A1 11/2022 Liu et al.

FOREIGN PATENT DOCUMENTS

CA 2376370 C 7/2012
EP 0702497 B1 8/2004

* cited by examiner

*Primary Examiner* — Frantz Bataille
(74) *Attorney, Agent, or Firm* — PERRY + CURRIER INC. (FOR MSI)

(57) ABSTRACT

Based on receiving new subscriber records at a device (e.g., a call controller), or the device being turned on, the device maintains, at a subscriber database, current subscriber records, each associated with a subscriber identifier and a version number. The device receives the new records and assigns a new and different version number thereto. For a new record comprising a respective subscriber identifier, the device: searches the current records for the respective identifier; when a current record having the respective identifier is found, updates the current record based on configuration data obtained from the new record and replaces the number associated with the current record with the new number; and when the respective identifier is not found, adds the new record to the database in association with the new number. The device removes, from the database, all current records associated with a respective number different from the new number.

20 Claims, 7 Drawing Sheets

DEVICE, SYSTEM, AND METHOD FOR UPDATING SUBSCRIBER RECORDS AT A CALL CONTROLLER TO MAINTAIN ONGOING CALLS

BACKGROUND OF THE INVENTION

Call controllers may generally manage calls between mobile devices, such as radios, and the like. Furthermore, in certain first responder and/or military environments, some call controllers may be portable, and/or deployable, and/or mobile, for example to manage calls between mobile devices of personnel that have been deployed to a particular area. In such environments, however, numbers of personnel in the area, as well as associated mobile devices, may be extremely variable. As such, subscriber records used by a call controller may be frequently updated, with such subscriber records defining respective permissions, capabilities, and the like, of mobile devices being managed by the call controller. During such updates, it is important to maintain integrity of ongoing calls between the mobile devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
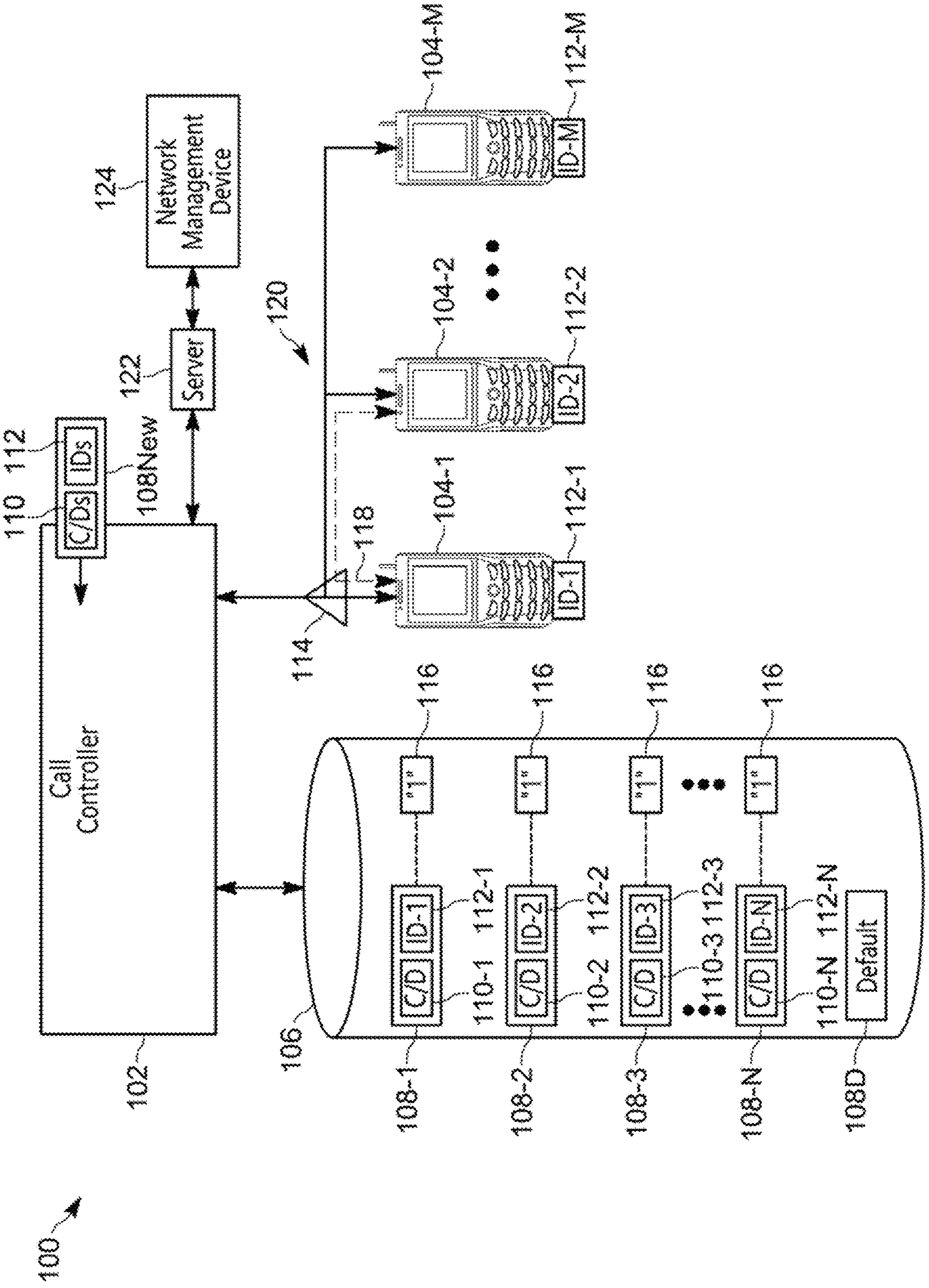
FIG. 1 is a system for updating subscriber records at a call controller to maintain ongoing calls, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some call controllers are mobile, and hence may have certain functionality for managing calls between mobile devices that may be particular to such mobility. In particular, such call controllers may often be deployed and turned on, and may need to manage calls between mobile devices as quickly as possible. For example, such call controllers and the devices may be deployed into theaters of operation where calls between the mobile devices may be mission critical. However, such call controllers generally depend on subscriber records, which may include configuration data and subscriber identifiers associated with the mobile devices. When such a call controller is initially turned on, however, subscriber records that the call controller has access to may be stale, and hence may need to be immediately updated; furthermore, a memory where the subscriber records are stored may have limited storage as, like the call controller and the mobile devices, the memory may also be mobile, and storage limits may depend on a physical size of a hard drive, and the like, of the memory as deployed in the theatre of operation. In updating the subscriber records, whether based on the call controller being turned on, or due to later updates, the call controller may drop and/or interrupt and/or end ongoing calls. Thus, there exists a need for an improved technical method, device, and system for updating subscriber records at a call controller to maintain ongoing calls.

An aspect of the present specification provides a method comprising: based on receiving new subscriber records at a call controller, or the call controller being turned on, maintaining, via the call controller, at a subscriber database, current subscriber records, each current subscriber record associated with a subscriber identifier and a version number; receiving, at the call controller, the new subscriber records; assigning, via the call controller, a new version number to the new subscriber records, different from the version number of the current subscriber records; for a new subscriber record comprising a respective subscriber identifier: searching, via the call controller, the current subscriber records for the respective subscriber identifier at the subscriber database; when a current subscriber record having the respective subscriber identifier is found at the subscriber database, updating, via the call controller, the current subscriber record based on configuration data obtained from the new subscriber record and replacing the version number associated with the current subscriber record with the new version number; and when the respective subscriber identifier is not found at the subscriber database, adding, via the call controller, the new subscriber record to the subscriber database in association with the new version number; and, removing, via the call controller, from the subscriber database, all current subscriber records associated with a respective version number different from the new version number.

Another aspect of the present specification provides a device comprising: a controller; and a computer-readable storage medium having stored thereon program instructions that, when executed by the controller, causes the controller to perform a set of operations comprising: based on receiving new subscriber records at the device, or the device being turned on, maintaining at a subscriber database, current subscriber records, each current subscriber record associated with a subscriber identifier and a version number; receiving, at the call controller, the new subscriber records; assigning a new version number to the new subscriber records, different from the version number of the current subscriber records; for a new subscriber record comprising a respective subscriber identifier: searching the current subscriber records for the respective subscriber identifier at the subscriber database; when a current subscriber record having the respective subscriber identifier is found at the subscriber database, updating the current subscriber record based on configuration data obtained from the new subscriber record and replacing the version number associated with the current subscriber record with the new version number; and when the respective subscriber identifier is not found at the subscriber database, adding the new subscriber record to the subscriber database in association with the new version number; and, removing from the subscriber database, all current subscriber records associated with a respective version number different from the new version number.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for updating subscriber records at a call controller to maintain ongoing calls. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

The system 100 comprises a call controller 102 that is generally configured to manage calls between mobile devices 104-1, 104-2 . . . 104-M. The mobile devices 104-1, 104-2 . . . 104-M are interchangeably referred to hereafter, collectively, as the mobile devices 104 and, generically, as a mobile device 104; this convention will be used elsewhere throughout the present specification. Such calls between the mobile devices 104 are understood to include wireless calls and/or any other suitable wireless communications between the mobile devices 104, including, but not limited to Push-To-Talk (PTT) calls and/or communications.

In particular, the call controller 102 maintains a subscriber database 106 of current subscriber records 108-1, 108-2, 108-3 . . . 108-N (e.g., current subscriber records 108 and/or a current subscriber record 108), that comprise respective configuration data 110-1, 110-2, 110-3 . . . 110-N (e.g., configuration data 110 and/or a set of configuration data 110, and also labelled as C/D in FIG. 1) that may define, among other things, capabilities and/or permissions of respective mobile devices 104. Indeed, respective sets of configuration data 110 are understood to be associated with respective mobile devices 104 via respective subscriber identifiers 112-1, 112-2, 112-3. . . 112-N (e.g., subscriber identifiers 112 and/or a subscriber identifiers 112, and also labelled as ID-n in FIG. 1, where "n" is a number between 1 and N). In particular, the mobile devices 104 may also be referred to as subscriber units as the mobile devices 104 "subscribe" to mobile communication services that may be at least partially managed and/or provided by the call controller 102.

Furthermore, the identifiers 112 may include, but are not limited to, associated Media Access Control (MAC) addresses of the mobile devices 104, International Mobile Equipment Identifiers (IMEIs) of the mobile devices 104, Subscriber Identity Module (SIM) numbers of the mobile devices 104, a Universal Resource Identifier (URI) (e.g., such as a SIP (Session Initiation Protocol) URI and/or a Mission Critical Push To Talk (MCPTT) URI) and/or any other suitable identifiers of the mobile devices 104, and the like.

As depicted, for example, the subscriber identifier 112-1 may identify the mobile device 104-1, the subscriber identifier 112-2 may identify the mobile device 104-2, and a subscriber identifier 112-M may identify the mobile device 112-M, and the mobile devices 104-1, 104-2 . . . 104-M may respectively store the subscriber identifiers 112-1, 112-2 . . . 112-M. However, in examples described herein, it is understood that the subscriber database 106 may initially store current subscriber records 108-1, 108-2 respectively associated with the mobile devices 104-1, 104-2, but may not initially store a current subscriber record 108-M respectively associated with the mobile device 104-M.

Furthermore, a network via which the mobile devices 104 communicate may include portable base stations 114, that are deployed "in the field" with the call controller 102, and the subscriber database 106. While only one portable base station 114 is depicted, the system 100 may comprise a plurality of portable base stations 114.

The call controller 102 generally manages calls, and the like, between the mobile devices 104, which may be at least partially based on capabilities of the mobile devices 104, as defined by respective configuration data 110. Furthermore calls between the mobile devices 104 may occur only when the subscriber database 106 stores respective subscriber records 108 identified by subscriber identifiers 112 of the mobile devices 104.

For example, some mobile devices 104 may be capable of PTT calls and/or communications, but not video calls, while other mobile devices 104 may be capable of PTT calls and video calls; as such, when a mobile device 104 capable of video calls requests a video call with a mobile device 104 incapable of video calls, the call controller 102 may prevent such a video call, and/or the call controller 102 may convert the video call into a call type compatible with the capabilities of both mobile devices 104.

Furthermore, respective configuration data 110 may indicate general authorizations for a mobile device 104 to communicate within the system 100, and such configuration data 110 hence may include, but is not limited to, RADIUS (Remote Authentication Dial-In User Service) authentication information, encryption keys used in the system 100, and the like.

Furthermore, respective configuration data 110 may indicate general permission for a mobile device 104 to communicate within the system 100, and/or may indicate permissions for a mobile device 104 to communicate with other mobile devices 104, and/or may indicate permissions for specific mobile devices 104 to communicate with other specific mobile devices 104. Certain permission types are described in further detail herein.

As depicted, the current subscriber records 108 are all associated with a version number 116, which, as depicted, comprises "1", however any suitable numbering system may be used, such that the version number 116 comprises any suitable alphanumeric numbering, though, in some examples, the version number 116 may be provided in a graphical format. Put another way, a version number of the present specification is not limited merely to numbers, but may include, but is not limited to, any suitable alphanumeric and/or graphical identifier. Furthermore, while the same version number 116 is depicted in association with all the current subscriber records 108, more than one version number 116 may exist at the subscriber database 106.

While the version numbers 116 are depicted as being in association with respective current subscriber records 108, as indicated via a broken line therebetween, in other examples the version numbers 116 may be stored at a respective field inside a subscriber record 112. Indeed, the configuration data 110 and the subscriber identifiers 112 are understood to be stored at respective fields of a subscriber record 112. The configuration data 110 and the subscriber identifiers 112 and the versions numbers 116 may, however, be stored in any suitable manner.

As has been mentioned, the call controller 102, the mobile devices 104, the subscriber database 106, and the base station(s) 114 may all be portable and/or mobile, and may be deployed in a theatre of operation and/or a zone 120, both of which may refer to a geographic area where the mobile devices 104 are to be provided with functionality for communicating therebetween, for example via calls via the base station(s) 114. Hence, it is understood that the call controller 102 and the base stations(s) 114 may provide a local wireless communication network within the zone 120 where the mobile devices 104 are deployed.

For example, as depicted, it is understood that the call controller 102 and the base stations 114 have been deployed to the zone 120, the call controller 102 has been turned on, and the mobile devices 104-1, 104-2 have initiated a call 118 therebetween, as represented by a dashed line therebetween via the depicted base station 114 and associated communication links. Such a call 118 may comprise any suitable call according to respective capabilities of the mobile devices 104-1, 104-2. Furthermore, while the call 118 is depicted as being between two mobile devices 104, the call 118 may be between two or more mobile devices 104.

However, as depicted, the call controller 102 is further communicatively coupled to a server 122, which may comprise a database server, and the like, generally configured to manage subscriber records 108. It is understood that the server 122 may not be local to the zone 120.

For example, the mobile devices 104 may be registered with the server 122 and/or a network management device 124 (e.g., also not local to the zone 120), and as new mobile devices 104 enter the zone 120 and/or current mobile devices 104 leave the zone 120, the server 122 may provide new subscriber records $\mathbf{108}_{New}$ to the call controller 102, which uses the new subscriber records $\mathbf{108}_{New}$ to update the current subscriber records 108. For example, the new subscriber records $\mathbf{108}_{New}$ each generally comprise respective configuration data 110 and a respective subscriber identifier 112. The respective subscriber identifiers 112 may be the same, or different, as the subscriber identifiers 112 of the current subscriber records 108.

For example, in some instances, the server 122 may maintain a database (not depicted) of subscriber records 108 that may be the same as the current subscriber records 108 stored at the subscriber database 106. However, the server 122 may receive, from the network management device 124, data indicating changes to the subscriber records 108, which may include, but is not limited to, new subscriber records 108 of mobile devices 104 newly deployed in the zone 120, a list of subscriber records 108 (e.g., and/or associated subscriber identifiers 112) associated with mobile devices 104 that are no longer in the zone, and/or subscriber records 108 of all mobile devices 104 currently deployed in the zone 120. The server 122 may update its own database accordingly, and provide, to the call controller 102, the new subscriber records $\mathbf{108}_{New}$, which generally are intended to replace all the current subscriber records 108 stored at the subscriber database 106. Put another way, the new subscriber records $\mathbf{108}_{New}$ may include subscriber identifiers 112 of mobile devices 104 associated with current subscriber records 108, and/or the new subscriber records $\mathbf{108}_{New}$ may include subscriber identifiers 112 of mobile devices 104 not associated with current subscriber records 108. For example, the new subscriber records $\mathbf{108}_{New}$ may include respective subscriber records $\mathbf{108}_{New}$ associated with all of the mobile devices 104-1, 104-2 . . . 104-M, whereas the current subscriber records 108 may include respective subscriber records $\mathbf{108}_{New}$ associated with the mobile devices 104-1, 104-2, but not the mobile device 104-M.

Hence, when the call controller 102 is first turned on, current subscriber records 108 for some of the mobile devices 104 deployed to the zone 120 may have been previously registered at the subscriber database 106 (e.g., by way of having been received at the call controller 102 from the server 122 prior to the call controller 102 being turned off), and hence such mobile devices 104 may have immediate capability of conducting calls, such as the call 118.

However, other mobile devices 104 may not be associated with current subscriber records 108 and hence may not have immediate capability of conducting calls though, in some examples, as depicted, the subscriber database 106 may store one or more default subscriber records 108D which may be used by the call controller 102 to set up calls between one or more mobile devices 104 for which there is no corresponding current subscriber record 108. While not depicted, such default subscriber records 108D may include configuration data indicating a minimum capability of the mobile devices 104. Furthermore, such default subscriber records 108D may not be associated with a version number.

Regardless, the call controller 102 may be generally configured to replace all the current subscriber records 108 with the new subscriber records 108$_{New}$. For example, the call controller 102 may delete all the current subscriber records 108 at the subscriber database 106, and the call controller 102 may store all the new subscriber records 108$_{New}$ at the subscriber database 106. Again, some of the new subscriber records 108$_{New}$ may be associated with mobile devices 104 that were previously associated with current subscriber records 108, but their current subscriber records 108 are replaced with respective new subscriber records 108$_{New}$.

However, when the call controller 102 deletes a current subscriber record 108 associated with a mobile device 104 that is presently conducting a call, such a call will be dropped and/or interrupted and/or ended, as the call is generally set up using the current subscriber record 108 associated with the mobile device 104. While such a mobile device 104, when later associated with a new subscriber record 108, may reinitiate a similar call, such an interruption in communication between mobile devices 104 may interrupt mission critical communications, and further may waste processing and/or communication resources within the system 100 to again initiate a similar call.

To address this technical problem, the call controller 102 is configured to update existing current subscriber records 108 using the new subscriber records 108$_{New}$ rather than delete existing current subscriber records 108, as is next described.

For example, the call controller 102 is configured to assign a new version number to the new subscriber records 108$_{New}$, different from the version number 116 of the current subscriber records 108. For example, a new version number may be "2".

The call controller 102 is further configured to, for a new subscriber record 108$_{New}$ comprising a respective subscriber identifier 112: search the current subscriber records 108 for the respective subscriber identifier 112 at the subscriber database 106; when a current subscriber record 108 having the respective subscriber identifier 112 (e.g., of the new subscriber record 108$_{New}$) is found at the subscriber database 106, update the current subscriber record 108 based on configuration data 110 obtained from the new subscriber record 108$_{New}$ replacing the version number 116 of the current subscriber record 108 with the new version number; and when the respective subscriber identifier 112 (e.g., of the new subscriber record 108$_{New}$) is not found at the subscriber database 106, add the new subscriber record 108$_{New}$ to the subscriber database 106 with the new version number.

Furthermore, such a process is generally repeated for all the new subscriber record 108$_{New}$.

Put another way, when a new subscriber record 108$_{New}$ corresponds to a current subscriber record 108, that current subscriber record 108 is updated at the subscriber database 106 using information from the corresponding new subscriber record 108$_{New}$, which may include, but is not limited to, replacing and/or updating configuration data 110 of the current subscriber record 108 using configuration data 110 of the new subscriber record 108$_{New}$.

However, when the new subscriber record 108$_{New}$ does not correspond to a current subscriber record 108, that new subscriber record 108$_{New}$ is added to the subscriber database 106, for example as a new subscriber record 108. Indeed, herein for clarity, a subscriber record 108 stored at the subscriber database 106 will be referred to using the reference number "108", even when corresponding to a new subscriber record 108$_{New}$.

Furthermore, whether a current subscriber record 108 is updated at the subscriber database 106 using a new subscriber record 108$_{New}$, or a new subscriber record 108$_{New}$ is added to the subscriber database 106, any updated subscriber records 108 or new subscriber records 108$_{New}$ added to the subscriber database 106 are associated with the new version number. As such, once all the new subscriber record 108$_{New}$ are processed, any subscriber record 108 now stored at the subscriber database 106 having the old version number 116 is understood to be associated with mobile devices 104 that are no longer in the zone 120 and/or associated with mobile devices 104 that the call controller 102 is no longer to manage. As such, the call controller 102 may remove, from the subscriber database 106, all current subscriber records 108 associated with a version number different from the new version number.

In this manner, a current subscriber record 108 associated with an ongoing call, such as the call 118, may be updated, without deleting the current subscriber record 108, which generally enables the ongoing call (e.g., the call 118) to be maintained.

Furthermore, such a process may occur and/or be repeated whenever new subscriber records 108$_{New}$ are received, which may occur when the call controller 102 is turned on, or at a later time, for example as the mobile devices 104 in the zone 120 change (e.g., new subscriber records 108$_{New}$ may be received periodically).

It is hence further understood that the number "N" of subscriber records 108 stored at the subscriber database 106 may change after the new subscriber records 108$_{New}$ are received and processed. Furthermore the number of "M" of mobile devices 104 may initially be different from the number "N" of initial subscriber records 108, but after the new subscriber records 108$_{New}$ are processed by the call controller 102, as described above, the number of "M" of mobile devices 104 may be the same as the number "N" of subscriber records 108, at least temporarily.

It is furthermore understood that the subscriber database 106 may be storage limited for example due to the mobile nature of the subscriber database 106. For example, the subscriber database 106 may be stored at a memory, such as a hard-drive (e.g., a Hard Disk Drive (HDD) and/or a Solid State Drive (SSD)) and/or other physical storage device, and the like, deployed in the zone 120 with the call controller 102. Indeed, the subscriber database 106 may be embodied as a portion of a memory of the call controller 102. Regardless, due to such storage limitations, the subscriber database 106 may be limited to storing a predefined total number of subscriber records 108 (e.g., which may or may not include any default records 108D). Hence, in instances where the storage limit of the subscriber database 106 has been reached, when a new subscriber record 108$_{New}$ is to be stored at the subscriber database 106 in the aforementioned process, the call controller 102 may remove a current subscriber record 108 associated with the version number 116 to make room for the new subscriber record $108_{New}$. The call controller 102 may hence be further configured to remove a current subscriber record 108 associated with the version number 116 so as to not interfere with and/or drop and/or end an ongoing call, as is also described herein.

Figure 2:
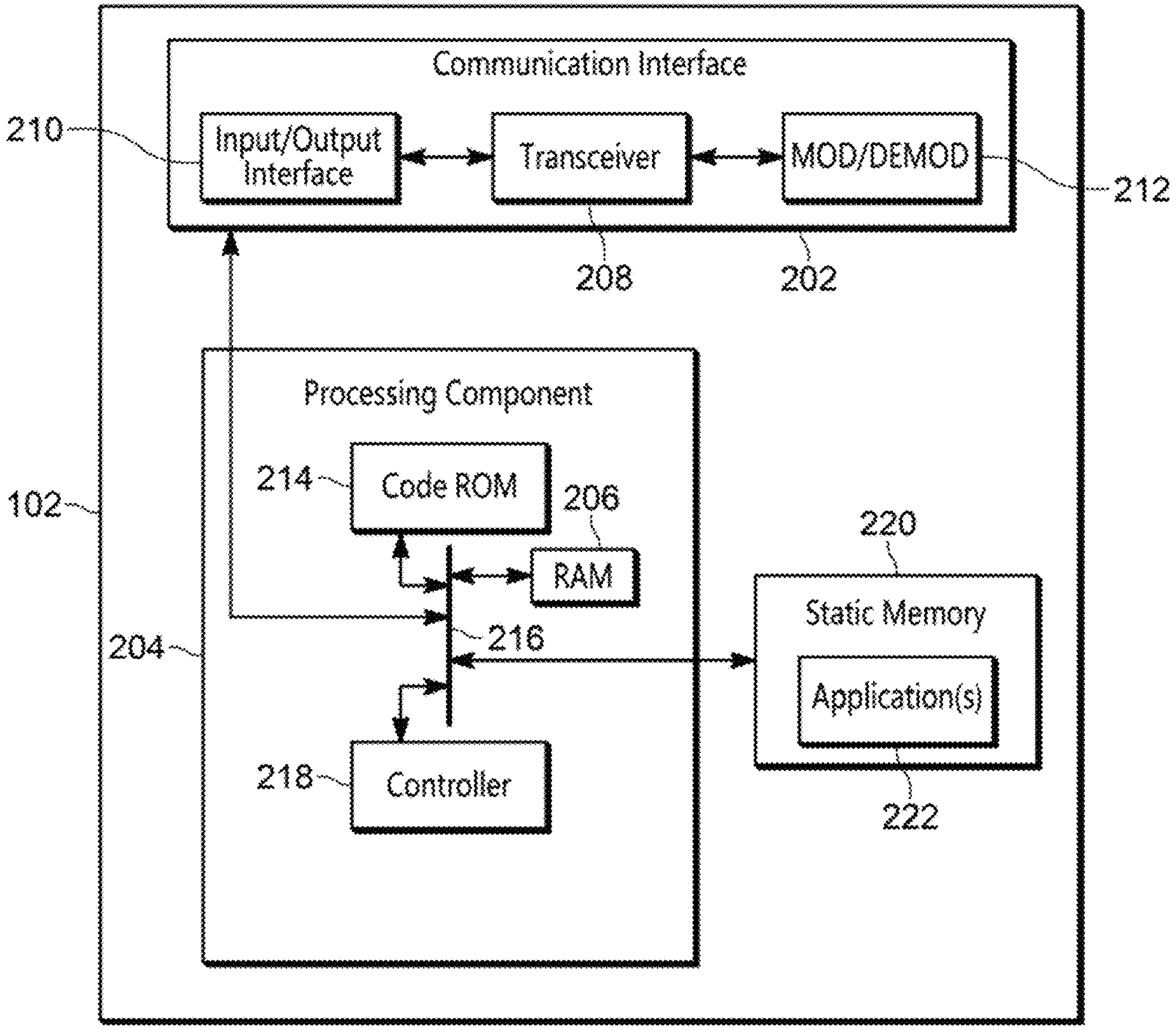
FIG. 2 is a device diagram showing a device structure of a computing device for updating subscriber records at a call controller to maintain ongoing calls, in accordance with some examples.

Attention is next directed to FIG. 2, which depicts a schematic block diagram of an example call controller 102. While the call controller 102 is depicted in FIG. 2 as a single component, the call controller 102 may be in a single component, or distributed among a plurality of components and the like including, but not limited to, any suitable combination of one or more call controllers 102.

As depicted, the call controller 102 comprises: a communication interface 202, a processing unit 204, a Random-Access Memory (RAM) 206, one or more wireless transceivers 208, one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the call controller 102 may have any suitable structure and/or configuration.

Furthermore, a portion of the memory 220 may comprise the subscriber database 106.

While not depicted, the call controller 102 may include, and/or be in communication with, one or more of an input component and a display screen (and/or any other suitable combination of input and/or output components) and the like.

As shown in FIG. 2, the call controller 102 includes the communication interface 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication interface 202 may include one or more wired and/or wireless input/output (I/O) interfaces 210 that are configurable to communicate with other components of the system 100. For example, the communication interface 202 may include one or more wired and/or wireless transceivers 208 for communicating with other suitable components of the system 100, such as the base station(s) 114 and the mobile devices 104, though it is understood that communication with the mobile devices 104 is at least partially wireless (e.g., between the base station(s) 114 and the mobile devices 104), whereas communication with the base station(s) may be wired and/or wireless.

Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or a new radio (NR) air interface compliant with the 3GPP TS 38 specification series standard), a Worldwide Interoperability for Microwave Access (WiMAX) network, for example operating in accordance with an IEEE 802.16 standard, and/or another similar type of wireless network (e.g., including, but not limited to, a satellite network). Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network (e.g., including, but not limited to, a satellite transceiver).

It is understood that while DMR transceivers, P25 transceivers, and TETRA transceivers may be particular to first responders, in some examples, the system 100 may be operated by one or more first responder entities (e.g., such as a police department, a fire department, an emergency medical services department, and the like), and hence such transceivers may be used for communications between the mobile devices 104 and the call controller 102.

In other examples, the system 100 may be operated by one or more military entities, with the transceivers 208 appropriately adapted according to communication protocols used by such military entities, and which may be proprietary to such military entities.

The communication interface 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the call controller 102 is not a generic controller and/or a generic device, but a device specifically configured to implement functionality for updating subscriber records at a call controller to maintain ongoing calls. For example, in some examples, the call controller 102 and/or the controller 218 specifically comprises a computer executable engine configured to implement functionality for updating subscriber records at a call controller to maintain ongoing calls.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the call controller 102 as described herein are maintained, persistently, at the memory 220 and used by the controller 218, which makes appropriate utilization of volatile storage during the execution of such programming instructions.

Figure 3:
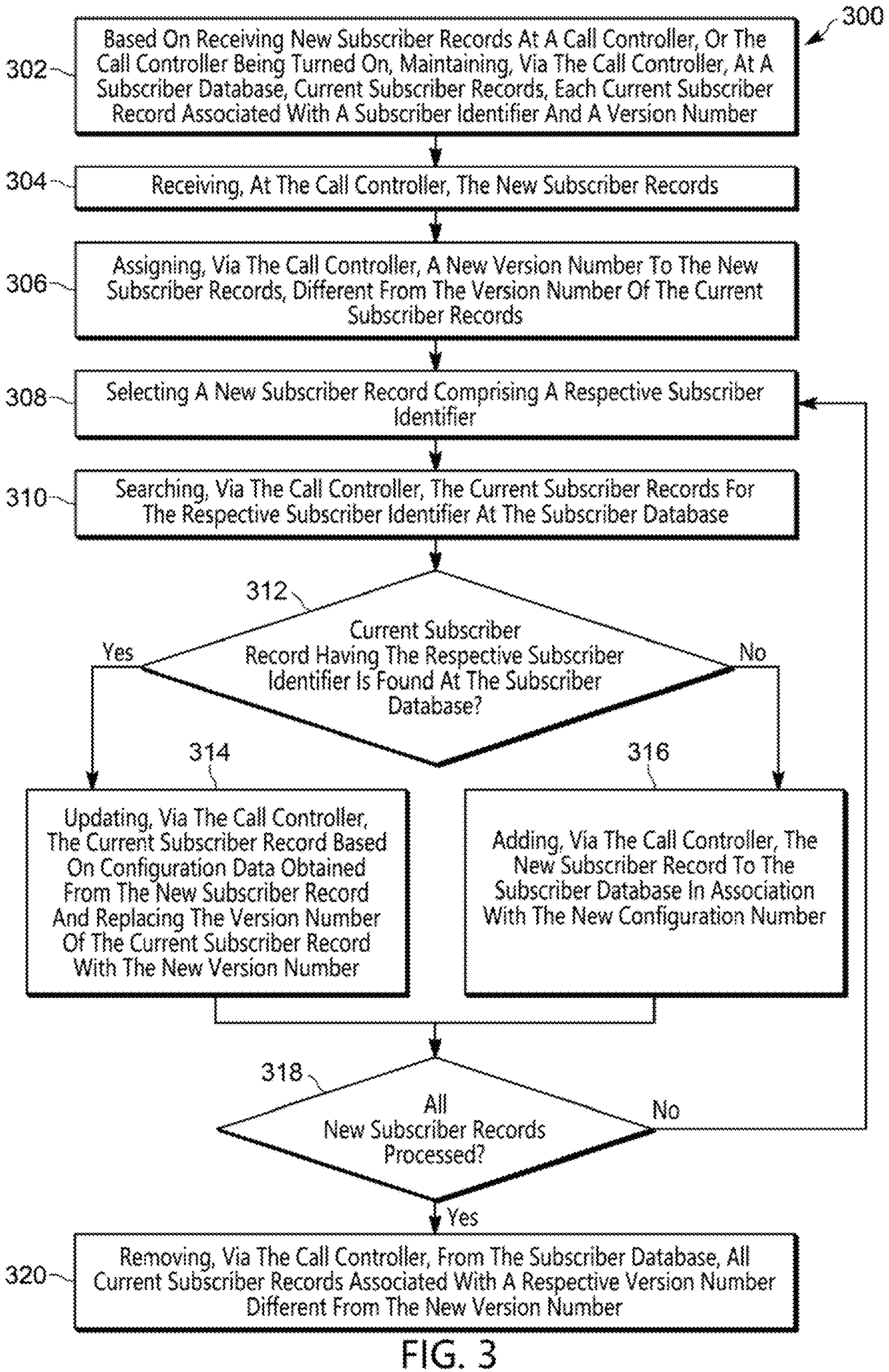
FIG. 3 is a flowchart of a method for updating subscriber records at a call controller to maintain ongoing calls, in accordance with some examples.

In particular, the memory 220 may store instructions corresponding to the at least one application 222 that, when executed by the controller 218, enables the controller 218 to implement functionality, including, but not limited to, blocks of the method set forth in FIG. 3.

While a schematic block diagram of the mobile devices 104, the server 122 and the network management device 124 are not depicted, the mobile devices 104, the server 122 and the network management device 124 may have respective structures similar to that of the call controller 102, but adapted for their respective functionality. For example, the mobile devices 104 may include wireless transceivers to conduct wireless calls via the base station(s) 114, and any suitable combination of input devices and output devices for initiating and conducting such calls.

Similarly, the server 122 may include wired and/or wireless transceivers to communicate with the call controller 102 and the network management device 124, and a controller of the server 122 is generally configured to manage subscriber records as described herein.

Similarly, the network management device 124 may include wired and/or wireless transceivers to communicate with the server 122, and a controller of the network management device 124 is generally configured to provide at least a portion of new subscriber records to the server 122. For example, an entity managing the system 100 may register new mobile devices 104, and associated subscriber records with the network management device 124, which may provide the associated subscriber records to the server 122.

Attention is now directed to FIG. 3, which depicts a flowchart representative of a method 300 for updating subscriber records at a call controller to maintain ongoing calls. The operations of the method 300 of FIG. 3 correspond to machine readable instructions that are executed by the controller 218 and/or the call controller 102. The method 300 of FIG. 3 is one way that the call controller 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 218, and/or the call controller 102, based on receiving the new subscriber records $\mathbf{108}_{New}$, or the call controller 102 being turned on, maintains, at the subscriber database 106, the current subscriber records 108, each current subscriber record 108 associated with a subscriber identifier 112 and a version number 116.

In particular, when the call controller 102 is turned on, the controller 218, and/or the call controller 102, maintains the current subscriber records 108 and does not, in response, delete the current subscriber records 108, at least not until processing the new subscriber records $\mathbf{108}_{New}$, as described herein.

Similarly, when the call controller 102 receives the new subscriber records $\mathbf{108}_{New}$, the controller 218, and/or the call controller 102, maintains the current subscriber records 108 and does not, in response, delete the current subscriber records 108, at least not until processing the new subscriber records $\mathbf{108}_{New}$, as described herein.

At a block 304, the controller 218, and/or the call controller 102, receives the new subscriber records $\mathbf{108}_{New}$.

For example, the method 300 may further comprise the controller 218, and/or the call controller 102, receiving the new subscriber records $\mathbf{108}_{New}$ in response to the call controller 102 being turned on.

Alternatively, or in addition, the method 300 may further comprise the controller 218, and/or the call controller 102, requesting the new subscriber records $\mathbf{108}_{New}$ in response to the call controller 102 being turned on. For example, the new subscriber records $\mathbf{108}_{New}$ may be requested and/or received from, the server 122.

Alternatively, or in addition, the method 300 may further comprise the controller 218, and/or the call controller 102, receiving the new subscriber records $\mathbf{108}_{New}$ from the server 122 in response to the server 122 receiving at least a portion of the new subscriber records $\mathbf{108}_{New}$ from the network management device 124.

At a block 306, the controller 218, and/or the call controller 102, assigns a new version number to the new subscriber records $\mathbf{108}_{New}$, different from the version number 116 of the current subscriber records 108.

For example, when the version number 116 of the current subscriber records 108 is "1", the new version number may comprise a number higher than, and/or different from "1", such as "2". When there is more than one version number associated with the current subscriber records 108, the new version number is understood to be different from all the version numbers associated with the current subscriber records 108 at the subscriber database 106.

Furthermore, the new version number may be assigned to all the new subscriber records $\mathbf{108}_{New}$. Indeed, in general, the new version number is assigned to the new subscriber records $\mathbf{108}_{New}$ to distinguish the new subscriber records $\mathbf{108}_{New}$ from the current subscriber records 108 stored at the subscriber database 106, and associated with the version number 116, when the new subscriber records $\mathbf{108}_{New}$ are received. However, any suitable combination of new version numbers and/or current version numbers 116 are with the scope of the present specification.

At a block 308, the controller 218, and/or the call controller 102, selects a new subscriber record $\mathbf{108}_{New}$, comprising a respective subscriber identifier 112, for processing according to a block 310, a block 312, a block 314, a block 316 and a block 318 as is next described. For example, as will be explained hereafter, the block 308 to the block 318 may be repeated for all the new subscriber records $\mathbf{108}_{New}$. Hence, at a first iteration of the block 308 to the block 318, a first new subscriber record $\mathbf{108}_{New}$ is selected, and, at a subsequent iteration of the block 308 to the block 318, a next new subscriber record $\mathbf{108}_{New}$ is selected, until all the new subscriber records $\mathbf{108}_{New}$ have been selected. The selection of new subscriber record $\mathbf{108}_{New}$ may occur in order of receipt, and/or randomly, and/or in any suitable order.

At a block 310, the controller 218, and/or the call controller 102, searches the current subscriber records 108 for the respective subscriber identifier 112 (e.g., of the new subscriber record $\mathbf{108}_{New}$ selected at the block 310) at the subscriber database 106.

At a block 312, the controller 218, and/or the call controller 102, determines whether a current subscriber record 108 having the respective subscriber identifier 112 (e.g., of the new subscriber record $\mathbf{108}_{New}$ selected at the block 310) is found or not found at the subscriber database 106.

When a current subscriber record 108 having the respective subscriber identifier 112 (e.g., of the new subscriber record $\mathbf{108}_{New}$ selected at the block 310) is found at the subscriber database 106 (e.g., a "YES" decision at the block 312), at a block 314, the controller 218, and/or the call controller 102, updates the current subscriber record 108 based on configuration data 110 obtained from the new subscriber record 108M, and replaces the version number 116 of the current subscriber record 108 with the new version number. In particular, the current subscriber record 108 is not deleted, but updated. Hence, any ongoing call associated with the current subscriber record 108 is not dropped and/or interrupted and/or ended.

Furthermore, new configuration data 110 obtained from the new subscriber record $\mathbf{108}_{New}$ may be the same or different from old configuration data 110 that is updated. For example, any capabilities of an associated mobile device 104 that have been updated since the current subscriber record 108 was stored at the subscriber database 106, as indicated via the new configuration data 110, may be updated, and/or permissions and/or authorizations to use the call controller 102 to make calls, as indicated via the new configuration data 110, may be updated.

In some examples, when the configuration data 110 obtained from the new subscriber record $\mathbf{108}_{New}$ is the same as the old configuration data 110, the updating process of the block 314 may include comparing the old and new configuration data 110 and changing the old configuration data 110 only when differences therebetween are found.

Alternatively, the new configuration data 110 may always replace the old configuration data 110 regardless of any differences therebetween. In these examples, no comparison may occur between the old and new configuration data 110, to reduce processing time in the updating.

Put another way, in some examples, updating the current subscriber record 108 based on the configuration data 110 obtained from the new subscriber record $\mathbf{108}_{New}$ may comprise: replacing current configuration data 110 of the current subscriber record 108 with the configuration data 110 obtained from the new subscriber record $\mathbf{108}_{New}$.

Returning to the block 312, when a current subscriber record 108 having the respective subscriber identifier 112 (e.g., of the new subscriber record $\mathbf{108}_{New}$ selected at the block 310) is not found at the subscriber database 106 (e.g., a "NO" decision at the block 312), at a block 316, the controller 218, and/or the call controller 102, adds the new subscriber record $\mathbf{108}_{New}$ to the subscriber database 106 in association with the new version number. The new subscriber record $\mathbf{108}_{New}$ hence is stored as a new current subscriber record 108, but in association with the new version number.

At a block 318, the controller 218, and/or the call controller 102, determines whether all the new subscriber records $\mathbf{108}_{New}$ have been processed and, if not (e.g., a "NO" decision at the block 318), the block 308 to the block 318 is repeated for a next new subscriber record $\mathbf{108}_{New}$.

Indeed, the block 308 to the block 318 is repeated until all the new subscriber records $\mathbf{108}_{New}$ are processed (e.g., a "YES" decision at the block 318), and, at a block 320, the controller 218, and/or the call controller 102, removes, from the subscriber database 106, all current subscriber records 108 associated with a respective version number different from the new version number. For example, all the current subscriber records 108 associated with the version number 116 of "1" are deleted from the subscriber database 106. In some examples, however any default subscriber records 108D may be maintained.

The method 300 may include other features, as is next described.

For example, the method 300 may further comprise, the controller 218, and/or the call controller 102, prior to updating one or more given current subscriber records 108 (e.g., at one or more instances of the block 314), establishing a call between at least two mobile devices 104 associated with one or more of the given current subscriber records 108 being updated. For example, the call 118 between the mobile devices 104-1, 104-2 may be established prior to updating any associated current subscriber records 108-1, 108-2. It is understood that such a call is not dropped and/or interrupted ended during the updating.

For example, the method 300 may further comprise, the controller 218, and/or the call controller 102, prior to adding a new subscriber record $\mathbf{108}_{New}$ to the subscriber database 106 (e.g., at the block 316): determining that a total number (e.g., "N") of subscriber records 108 stored at the subscriber database 106 is at a predefined total number; and removing a given current subscriber record 108 to reduce the total number of the subscriber records 108 stored at the subscriber database 106 to less than the predefined total number. Such a predefined total number may depend on a capacity of a memory storing the subscriber database 106. In some examples the predefined total number may be on the order of tens of subscriber records 108, in other examples the predefined total number may be on the order of thousands of subscriber records 108, whereas in other examples the predefined total number may be on the order of tens of thousands of subscriber records 108; however any suitable predefined total number is within the scope of the present specification.

For example, the current subscriber records 108, or any subscriber records 108 stored at the subscriber database 106, may be stored with a date and/or time of a respective modification date, a date and/or time of calls and/or a last call made by an associated mobile device 104, an identifier and/or priority of an associated agency, and the like.

For example, while the method 300 is generally directed to updating all the subscriber records 108 stored at the subscriber database 106, in some instances, a subscriber record 108 may be modified independent of the method 300, for example to update respective configuration data 110 when capabilities of an associated mobile device 104 are updated. Such a date of modification may be stored at a respective subscriber record 108.

Alternatively, or in addition, respective configuration data 110 may be updated at a subscriber record 108, independent of the method 300 when permissions of a respective mobile device 104 are updated. For example, as the mobile devices 104 may be deployed in a military environment, operators of the mobile devices 104 may have ranks. In these examples, an existing mobile device 104 may be reassigned from a first operator to a second operator, the second operator having a higher rank than the first operator. In such a situation, permissions of the existing mobile device 104 may be updated to reflect associated permissions of the second operator. In a particular example, calls between mobile devices 104 may be restricted based on rank of associated operators such that a given operator, such as a "private", may not call a "general" and/or officers above a given rank, but a "general" and/or an officer may call anyone below a given rank.

Alternatively, or in addition, the mobile devices 104 may be associated with different agencies. Again using the military example, some mobile devices 104 may be associated with an army agency, while other mobile devices 104 may be associated with a marines agency, while yet other mobile devices 104 may be associated with a medic agency. In some of these examples, the agencies may be ranked and/or may have different priorities, which may be stored in respective subscriber records 108 and/or stored in another format at the subscriber database 106 and/or the memory 220.

Hence, in some examples, where removing a given current subscriber record 108 to reduce the total number of the subscriber records 108 stored at the subscriber database 106 to less than the predefined total number occurs, the given current subscriber record 108 that is removed may comprise an oldest current subscriber record 108, the oldest subscriber record 108 comprising a respective subscriber record 108 having an oldest modification date. In these examples, where two subscriber records 108 have the same oldest modification date, the subscriber record 108 that is removed may have the oldest associated modification time.

Alternatively, or in addition, where removing a given current subscriber record 108 to reduce the total number of the subscriber records 108 stored at the subscriber database 106 to less than the predefined total number occurs, the given current subscriber record 108 that is removed may comprise an oldest current subscriber record 108, the oldest subscriber record 108 comprising a respective subscriber record 108 having an oldest call date. In these examples, where two subscriber records 108 have the same oldest call date, the subscriber record 108 that is removed may have the oldest associated time for the call.

Alternatively, or in addition, where removing a given current subscriber record 108 to reduce the total number of the subscriber records 108 stored at the subscriber database 106 to less than the predefined total number occurs, the given current subscriber record 108 that is removed may be associated with one or more agencies having a lowest priority. In these examples, where two subscriber records 108 have the same oldest call date, the subscriber record 108 that is removed may be associated with an agency having a lowest priority.

In all of these examples, when the two subscriber records 108 have similar and/or identical criteria for being removed, the subscriber record 108 (e.g., amongst the aforementioned two subscriber records 108) that is removed may be selected randomly.

In yet further examples, the method 300 may further comprise the controller 218 and/or the call controller 102, prior to adding a new subscriber record $\mathbf{108}_{New}$ to the subscriber database 106 (e.g., at the block 316): determining that a total number of subscriber records 108 stored at the subscriber database 106 is at a predefined total number; and removing a current subscriber record 108 to reduce the total number of the subscriber records 108 to less than the predefined total number, wherein the current subscriber record 108 is not associated with a current call.

Put another way, any subscriber records 108 associated with a current call, such as the call 118, are excluded from removal, at least until the current call has ended. As such, it is understood that the call controller 102 generally tracks which mobile devices 104 are currently in calls as the mobile devices 104 generally set up calls via the call controller 102.

However, any suitable scheme may be used to remove subscriber records 108 from the subscriber database 106. For example, the call controller 102 may be configured to determine which subscriber record 108 is preferable to remove, by searching of the subscriber records 108 at the subscriber database 106 not associated with the new version number, for the following properties in order: a default record 108D, a subscriber record 108 not recently associated with a call (e.g., withing a given time period, such as since being turned on, and/or since a last subscriber record update, and/or 1 hour, 2 hours, 3 hours, amongst other possibilities), a subscriber record 108 not associated with a current call. Hence, in some examples, a default records 108D may be first removed.

In yet further examples, the method 300 may further comprises the controller 218 and/or the call controller 102, when a current subscriber record 108 having the respective subscriber identifier 112 (e.g., of the new subscriber record $\mathbf{108}_{New}$ selected at the block 308) is found at the subscriber database 106, discarding the new subscriber record $\mathbf{108}_{New}$ after updating (e.g., at the block 314) the current subscriber record 108. Hence, the call controller 102 may generally discard new subscriber records $\mathbf{108}_{New}$ after processing.

Attention is next directed to FIG. 4, FIG. 5, FIG. 6, and FIG. 7, which depict an example of the method 300. FIG. 4, FIG. 5, FIG. 6, and FIG. 7 are substantially similar to FIG. 1, with like components having like numbers.

Figure 4:
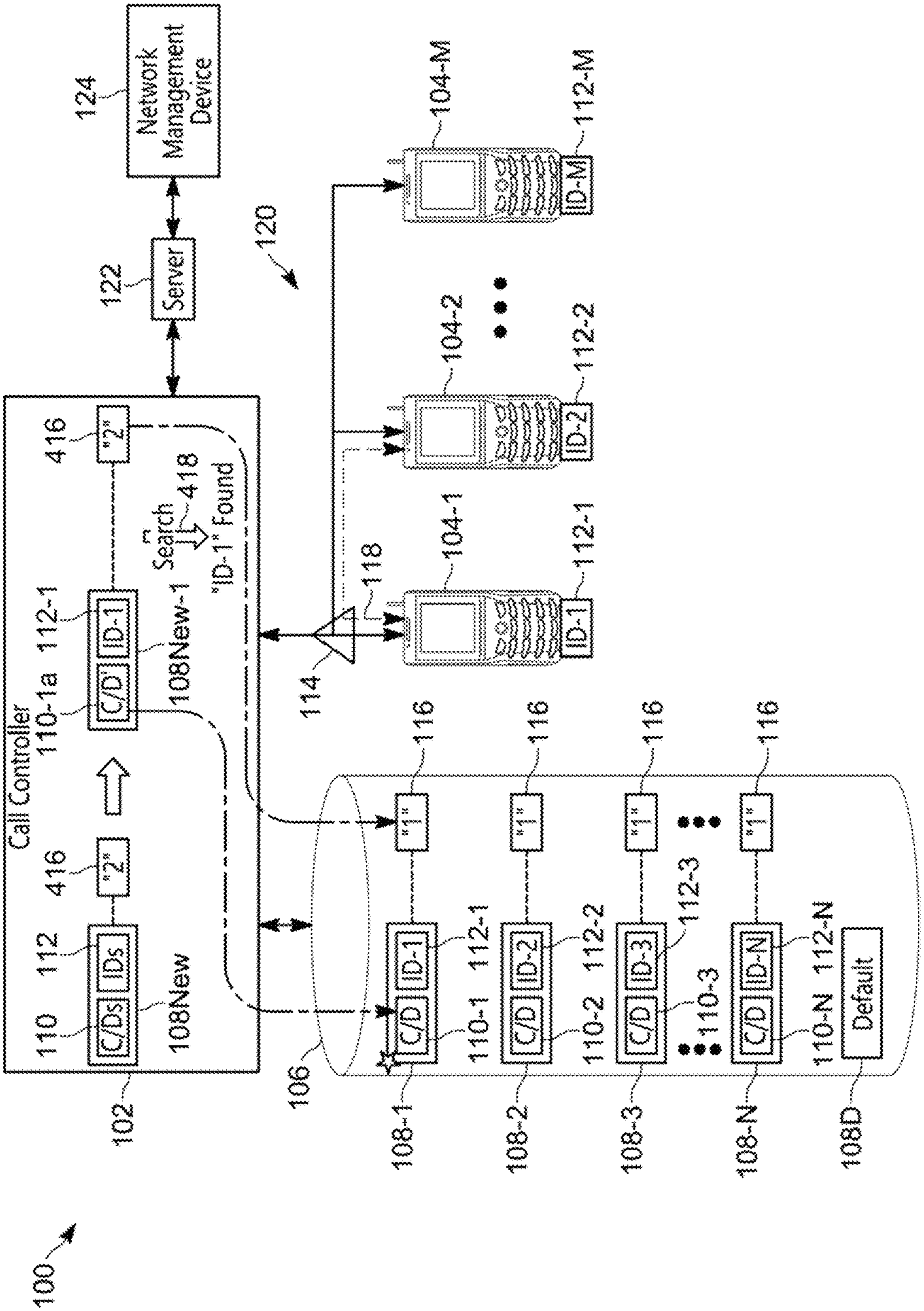
FIG. 4 depicts the system of FIG. 1 implementing a method for updating subscriber records at a call controller to maintain ongoing calls, in accordance with some examples.

With attention first directed to FIG. 4, it is understood that the call controller 102 has been turned on and/or received (e.g., at the block 304 of the method 300) the new subscriber records $\mathbf{108}_{New}$ and has maintained (e.g., at the block 302 of the method 300) the current subscriber records 108 at the subscriber database 106.

As also depicted in FIG. 4, the call controller 102 assigns (e.g., at the block 306 of the method 300) a new version number 416 of "2" to the new subscriber records $\mathbf{108}_{New}$, which is different from the current version number 116 of "1" associated with the current subscriber records 108 stored at the subscriber database 106.

As also depicted in FIG. 4, the call controller 102 selects (e.g., at the block 308 of the method 300) a first new subscriber record $\mathbf{108}_{New}$-1 having an associated subscriber identifier 112-1 (e.g., "ID-1") that is the same as the subscriber identifier 112-1 of the current subscriber record 108-1. The first new subscriber record $\mathbf{108}_{New}$-being the same as the subscriber identifier 112-1 of the current subscriber record 108-1 is represented in FIG. 4 by a star at the current subscriber record 108-1. However, the configuration data 110-1*a* of the first new subscriber record $\mathbf{108}_{New}$-1 (e.g., also labelled "C/D") may be different from the configuration data 110-1 of the current subscriber record 108-1.

As also depicted in FIG. 4, the call controller 102 searches (e.g., at the block 310 of the method 300) the subscriber database 106 for a current subscriber record 108 having the subscriber identifier 112-1, and finds (e.g., a "YES" decision at the block 312 of the method 300) the current subscriber record 108-1. To represent the search and the finding of the current subscriber record 108-1, an arrow 418 indicating the "SEARCH" is depicted, the current subscriber record 108-1 is marked with a star at the subscriber database 106 and the text ""ID-1" Found" is shown.

As the current subscriber record 108-1 having the respective subscriber identifier 108-1 is found at the subscriber database 106, the call controller 102 updates (e.g., at the block 314 of the method 300) the current subscriber record 108-1 by replacing the configuration data 108-1 with the configuration data 108-1*a*, obtained from the new subscriber record $\mathbf{108}_{New}$-1, and replaces the version number 116 associated with the current subscriber record 108-1 with the new version number 416, as represented by arrows from the configuration data 108-1*a* to the configuration data 108-1, and from the new version number 416 to the version number 116 associated with the current subscriber record 108-1.

Figure 5:
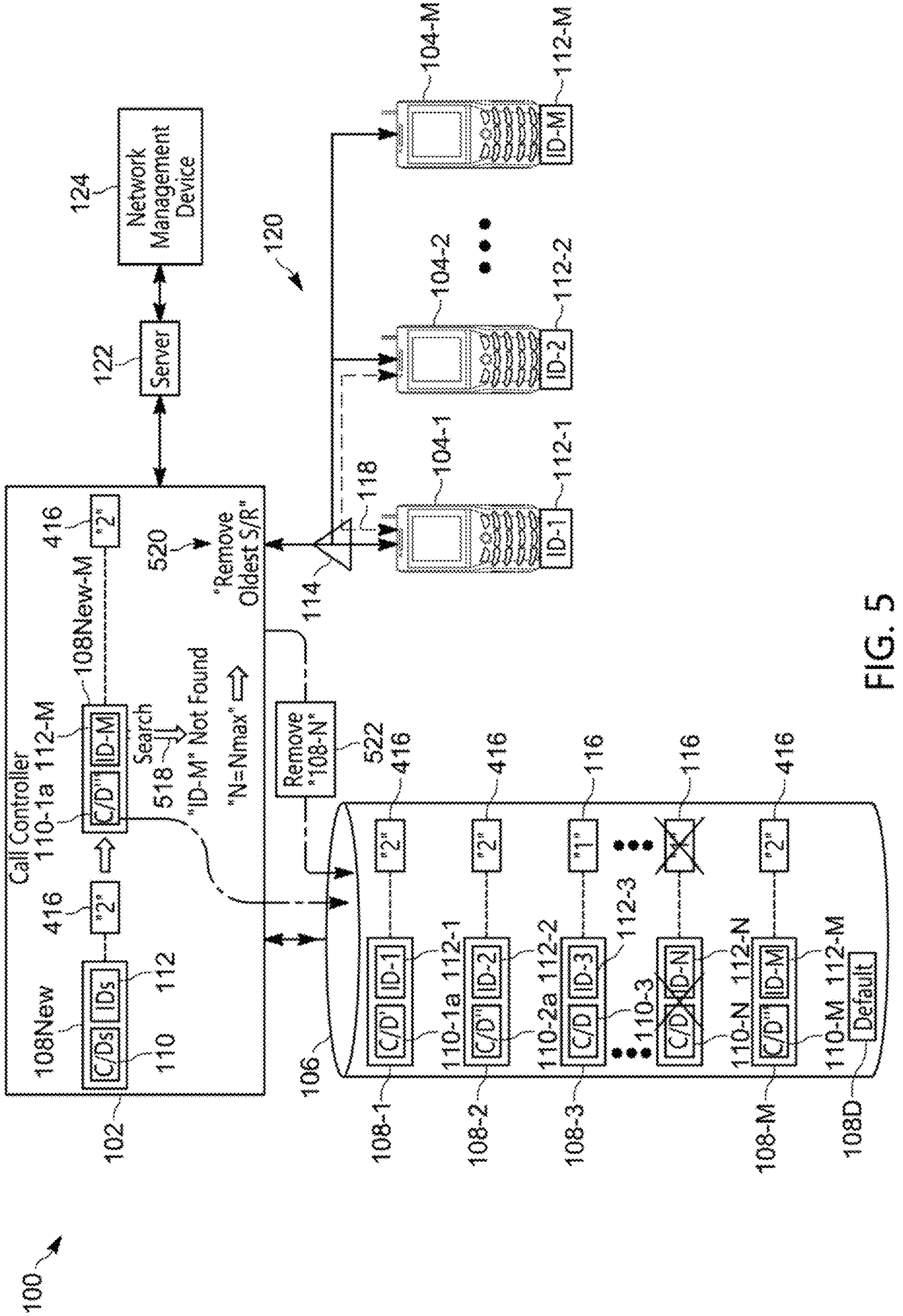
FIG. 5 depicts the system of FIG. 1 continuing to implement a method for updating subscriber records at a call controller to maintain ongoing calls, in accordance with some examples.

Attention is next directed to FIG. 5, which is understood to follow from FIG. 4. In particular, at FIG. 5, it is understood that that the current subscriber record 108-1 has been updated to replace the old configuration data 110-1, with the new configuration data 110-1*a*, and the current subscriber record 108-1 is now associated with the new version number 416. Furthermore, it is understood that a similar process has occurred for the current subscriber record 108-2, assuming that a new subscriber record $\mathbf{108}_{New}$ has the same subscriber identifier 112-2 as the current subscriber record 108-2. As such, as also depicted in FIG. 5, the current subscriber record 108-2 has also been updated to replace the old configuration data 110-2, with new configuration data 110-2*a* (e.g., also labelled "C/D" "in FIG. 5), and the current subscriber record 108-2 is now associated with the new version number 416.

FIG. 5 further depicts an example of the block 316.

For example, FIG. 5 further depicts the call controller 102 selecting another new subscriber record $\mathbf{108}_{New}$-M having an associated subscriber identifier 112-M (e.g., "ID-M") and including configuration data 110-M (e.g., also labelled "C/D" ").

As also depicted in FIG. 4, the call controller 102 searches (e.g., at the block 310 of the method 300) the subscriber database 106 for a current subscriber record 108 having the subscriber identifier 112-M. However, in this instance the call controller 102 does not find (e.g., a "NO" decision at the block 312 of the method 300) any current subscriber records 108 having the subscriber identifier 112-M. To represent the search and not finding any current subscriber records 108 having the subscriber identifier 112-M, an arrow 518 indicating the "SEARCH" is depicted, and the text ""ID-M" Not Found" is shown.

As no current subscriber record 108 having the respective subscriber identifier 108-M is found at the subscriber database 106, the call controller 102 adds (e.g., at the block 316 of the method 300) the new subscriber record $\mathbf{108}_{New}$-M to the subscriber database 106, for example as a new current subscriber record 108-M, as represented by an arrow from the new subscriber record $\mathbf{108}_{New}$-M to the subscriber database 106.

Figure 6:
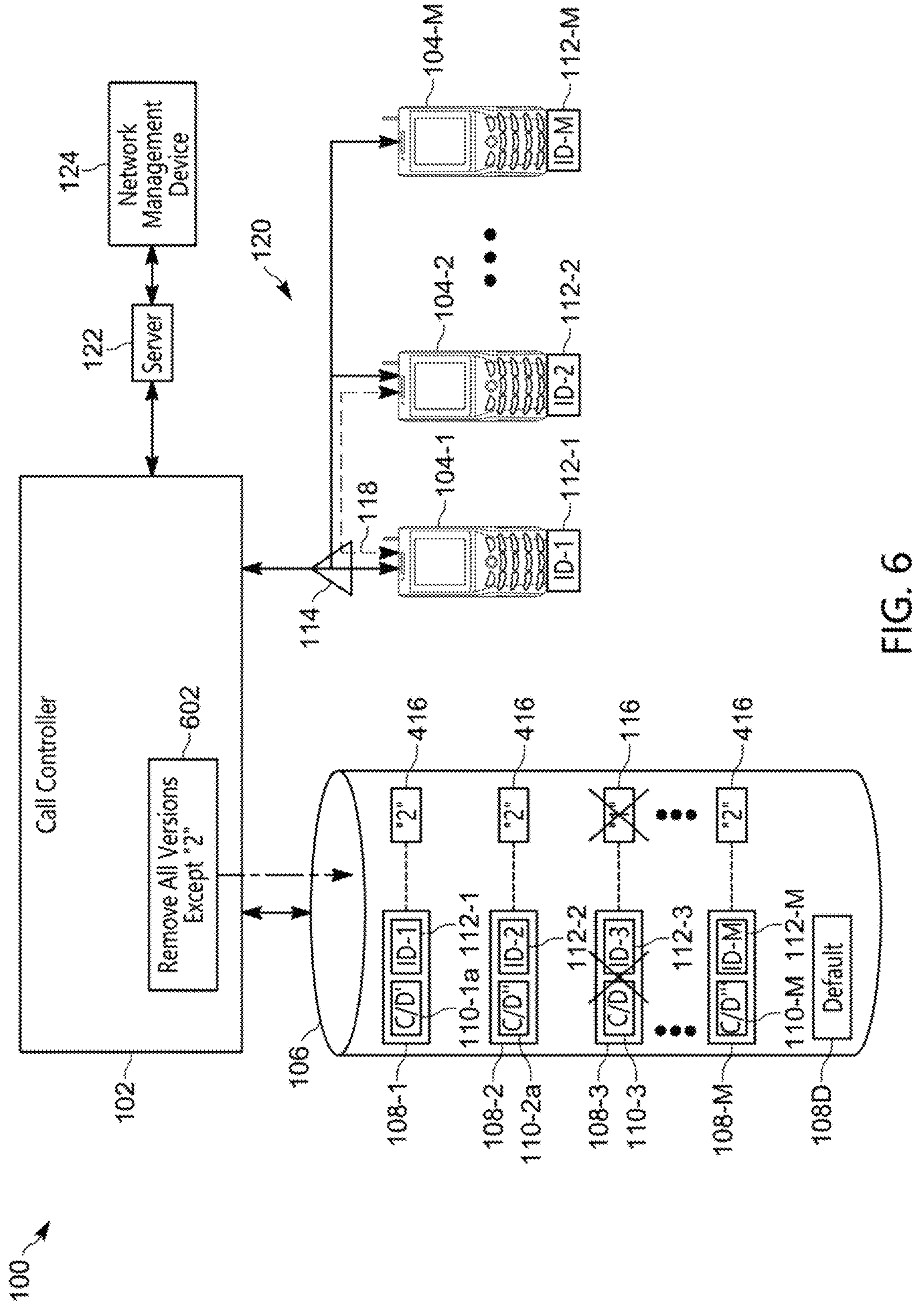
FIG. 6 depicts the system of FIG. 1 continuing to implement a method for updating subscriber records at a call controller to maintain ongoing calls, in accordance with some examples.

However, prior to adding the new current subscriber record 108-M to the subscriber database 106, the call controller 102 may determines, at a process 520, that the total number "N" of subscriber records 108 stored at the subscriber database 106 is at a predefined total number "Nmax", and hence removes an oldest subscriber record 108 (e.g., where "S/R" indicates "subscriber record" in FIG. 6). As depicted, the call controller 102 determines that the current subscriber record 108-N is the oldest subscriber record 108, and removes the current subscriber record 108-N from the subscriber database 106 via a command 522 (e.g., "Remove "108-N" "). Such removal is indicated via an "X" through the subscriber record 108-N at the subscriber database 106. Alternatively, a default record 108D may be removed from the subscriber database 106.

Presuming that the new subscriber record $\mathbf{108}_{New}$-M is a last new subscriber record $\mathbf{108}_{New}$ (e.g., a "YES" decision at the block 318), and as depicted in FIG. 6, the call controller 102 removes from the subscriber database 106, all current subscriber records 108 associated with a respective version number different from the new version number 416. For example, as depicted, the call controller 102 provides a command 602 (e.g., "Remove All Versions Except For "2" ") to the subscriber database 106. Such removal is indicated via an "X" through the subscriber records 108 associated with any version number other than "2", is indicated via an "X" through the subscriber record 108-3 at the subscriber database 106. As depicted, default records 108D may be exempt from such removal.

Figure 7:
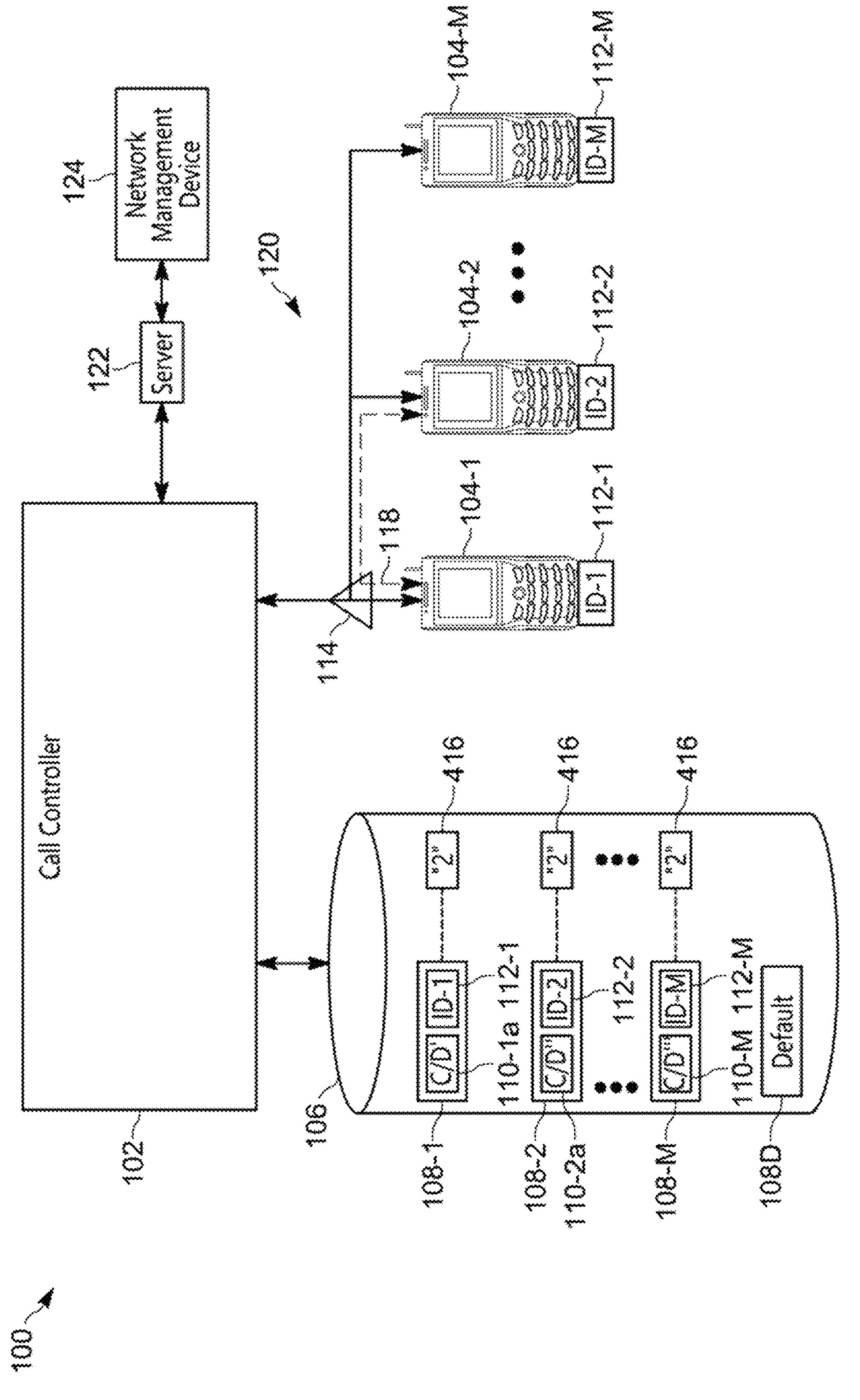
FIG. 7 depicts the system of FIG. 1 after implementing a method for updating subscriber records at a call controller to maintain ongoing calls, in accordance with some examples.

Attention is directed to FIG. 7, which depicts the system 100 after the method 300 is complete. In particular, all the subscriber records 108 associated with the version number 116 of "1" have been removed, and only subscriber records 108 associated with the new version number 416 of "2" remain (e.g., other than the default subscriber record(s) 108D). Furthermore, such removal has occurred without dropping and/or interrupting and/or ending the call 118 as the subscriber records 108-1, 108-2 respectively associated with the mobile devices 104-1, 104-2 were updated and not deleted, with their associated version numbers also updated.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, establish calls, and the like).

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

based on receiving new subscriber records at a call controller, or the call controller being turned on, maintaining, via the call controller, at a subscriber database, current subscriber records, each current subscriber record associated with a subscriber identifier and a version number;

receiving, at the call controller, the new subscriber records;

assigning, via the call controller, a new version number to the new subscriber records, different from the version number of the current subscriber records;

for a new subscriber record comprising a respective subscriber identifier:

searching, via the call controller, the current subscriber records for the respective subscriber identifier at the subscriber database;

when a current subscriber record having the respective subscriber identifier is found at the subscriber database, updating, via the call controller, the current subscriber record based on configuration data obtained from the new subscriber record and replacing the version number associated with the current subscriber record with the new version number; and when the respective subscriber identifier is not found at the subscriber database, adding, via the call controller, the new subscriber record to the subscriber database in association with the new version number; and, removing, via the call controller, from the subscriber database, all current subscriber records associated with a respective version number different from the new version number.

2. The method of claim 1, further comprising, prior to adding the new subscriber record to the subscriber database:

determining that a total number of subscriber records stored at the subscriber database is at a predefined total number; and removing a given current subscriber record to reduce the total number of the subscriber records to less than the predefined total number.

3. The method of claim 2, wherein the given current subscriber record that is removed comprises an oldest current subscriber record, the oldest subscriber record comprising a respective subscriber record having an oldest modification date.

4. The method of claim 2, wherein the given current subscriber record that is removed comprises an oldest current subscriber record, the oldest subscriber record comprising a respective subscriber record having an oldest call date.

5. The method of claim 2, wherein the given current subscriber record that is removed is associated with one or more agencies having a lowest priority.

6. The method of claim 1, further comprising, prior to adding the new subscriber record to the subscriber database:

determining that a total number of subscriber records stored at the subscriber database is at a predefined total number; and removing a current subscriber record to reduce the total number of the subscriber records to less than the predefined total number, wherein the current subscriber record is not associated with a current call.

7. The method of claim 1, wherein updating the current subscriber record based on the configuration data obtained from the new subscriber record comprises:

replacing current configuration data of the current subscriber record with the configuration data obtained from the new subscriber record.

8. The method of claim 1, further comprising:

when the current subscriber record having the respective subscriber identifier is found at the subscriber database, discarding the new subscriber record after updating the current subscriber record.

9. The method of claim 1, further comprising:

receiving, at the call controller, the new subscriber records in response to the call controller being turned on.

10. The method of claim 1, further comprising:

prior to updating one or more given current subscriber records, establishing, via the call controller, a call between at least two mobile devices associated with one or more of the given current subscriber records being updated.

11. A device comprising:

a controller; and a computer-readable storage medium having stored thereon program instructions that, when executed by the controller, causes the controller to perform a set of operations comprising:

based on receiving new subscriber records at the device, or the device being turned on, maintaining, at a subscriber database, current subscriber records, each current subscriber record associated with a subscriber identifier and a version number;

receiving the new subscriber records;

assigning a new version number to the new subscriber records, different from the version number of the current subscriber records;

for a new subscriber record comprising a respective subscriber identifier:

searching the current subscriber records for the respective subscriber identifier at the subscriber database;

when a current subscriber record having the respective subscriber identifier is found at the subscriber database, updating the current subscriber record based on configuration data obtained from the new subscriber record and replacing the version number associated with the current subscriber record with the new version number; and when the respective subscriber identifier is not found at the subscriber database, adding the new subscriber record to the subscriber database in association with the new version number; and, removing from the subscriber database, all current subscriber records associated with a respective version number different from the new version number.

12. The device of claim 11, wherein the set of operations further comprises, prior to adding the new subscriber record to the subscriber database:

determining that a total number of subscriber records stored at the subscriber database is at a predefined total number; and removing a given current subscriber record to reduce the total number of the subscriber records to less than the predefined total number.

13. The device of claim 12, wherein the given current subscriber record that is removed comprises an oldest current subscriber record, the oldest subscriber record comprising a respective subscriber record having an oldest modification date.

14. The device of claim 12, wherein the given current subscriber record that is removed comprises an oldest current subscriber record, the oldest subscriber record comprising a respective subscriber record having an oldest call date.

15. The device of claim 12, wherein the given current subscriber record that is removed is associated with one or more agencies having a lowest priority.

16. The device of claim 11, wherein the set of operations further comprises, prior to adding the new subscriber record to the subscriber database:

determining that a total number of subscriber records stored at the subscriber database is at a predefined total number; and removing a current subscriber record to reduce the total number of the subscriber records to less than the predefined total number, wherein the current subscriber record is not associated with a current call.

17. The device of claim 11, wherein updating the current subscriber record based on the configuration data obtained from the new subscriber record comprises:

replacing current configuration data of the current subscriber record with the configuration data obtained from the new subscriber record.

18. The device of claim 11, wherein the set of operations further comprises:

when the current subscriber record having the respective subscriber identifier is found at the subscriber database, discarding the new subscriber record after updating the current subscriber record.

19. The device of claim 11, wherein the set of operations further comprises:

receiving, at the call controller, the new subscriber records in response to the call controller being turned on.

20. The device of claim 11, wherein the set of operations further comprises:

prior to updating one or more given current subscriber records, establishing a call between at least two mobile devices associated with one or more of the given current subscriber records being updated.

* * * * *